(12) United States Patent
Cheryan (10) Patent No.: US 7,481,890 B2
(45) Date of Patent: Jan. 27, 2009

(54) CORN OIL AND DEXTROSE EXTRACTION APPARATUS AND METHOD

(75) Inventor: Munir Cheryan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 167 days.

(21) Appl. No.: 11/197,115

(22) Filed: Aug. 4, 2005

(65) Prior Publication Data

US 2006/0029715 A1 Feb. 9, 2006

Related U.S. Application Data

(60) Provisional application No. 60/598,998, filed on Aug. 5, 2004.

(51) Int. Cl.
*C13K 1/08* (2006.01)
*C12P 19/14* (2006.01)

(52) U.S. Cl. .............. 127/39; 127/24; 127/25; 127/40; 435/99

(58) Field of Classification Search ............ 127/1, 127/24, 25, 39, 40; 435/99
See application file for complete search history.

(56) References Cited

U.S. PATENT DOCUMENTS

| | | | |
|---|---|---|---|
| 3,962,335 A | 6/1976 | Kumar | |
| 3,963,575 A | 6/1976 | Bulich | |
| 4,093,540 A | 6/1978 | Sen Gupta | |
| 4,224,219 A | 9/1980 | Van Blanton et al. | |
| 4,414,157 A | 11/1983 | Iwama et al. | |
| 4,486,353 A | 12/1984 | Matsuzaki et al. | |
| 4,545,940 A | 10/1985 | Mutoh et al. | |
| 4,624,805 A | 11/1986 | Lawhon | |
| 4,716,218 A | 12/1987 | Chen et al. | |
| 4,787,981 A | 11/1988 | Tanahashi et al. | |
| 5,077,441 A | 12/1991 | Kuk et al. | |
| 5,166,376 A | 11/1992 | Suzuki et al. | |
| 5,254,673 A | 10/1993 | Cook et al. | |
| 5,310,487 A | 5/1994 | LaMonica | |
| 5,342,923 A | 8/1994 | Takahashi et al. | |
| 5,367,055 A | 11/1994 | Takahashi et al. | |
| 5,410,021 A | 4/1995 | Kampen et al. | |
| 5,482,633 A | 1/1996 | Muralidhara et al. | |
| 5,510,463 A | 4/1996 | Takahashi et al. | |
| 5,545,329 A | 8/1996 | LaMonica | |

(Continued)

OTHER PUBLICATIONS

N. Singh, M. Cheryan, "Extraction of Oil from Corn Distillers Dried Grains with Solubles", *Transactions of the ASAE*, vol. 41, No. 6, pp. 1-3.

(Continued)

*Primary Examiner*—David M Brunsman
(74) *Attorney, Agent, or Firm*—Greer, Burns & Crain, Ltd.

(57) ABSTRACT

Method and apparatus for processing corn into one or more corn products including dextrose. In a preferred process, corn is processed and treated with solvent(s) to extract oil. The oil can be subsequently recovered using membrane technology. Zein may also be produced if the solvent is an alcohol. Starch in the deoiled meal is converted to dextrose by liquefaction and saccharification with enzymes. The reaction mixture containing the dextrose and other components is subjected to one or more unit operations such as screening, filtration, and/or membrane technology to produce one or more of corn gluten, soluble protein, dextrose, and fiber.

26 Claims, 5 Drawing Sheets

U.S. PATENT DOCUMENTS

| | | | |
|---|---|---|---|
| 5,580,959 | A | 12/1996 | Cook et al. |
| 5,602,286 | A | 2/1997 | Muralidhara |
| 5,773,076 | A | 6/1998 | Liaw et al. |
| 6,365,732 | B1 | 4/2002 | Van Thorre |
| 6,433,146 | B1 | 8/2002 | Cheryan |
| 2003/0176669 | A1 | 9/2003 | Van Thorre |

OTHER PUBLICATIONS

M. Cheryan, Ultrafiltration and Microfiltration Handbook, Lancaster, PA; Technomic Publishing Co. (1998.), (4 title pages).

D. Chang, M.P. Hojilla-Evangelista, L.A. Johnson, D.J. Myers, "Economic-Engineering Assessment of Sequential Processing of Corn", *Transactions of the ASAE*, vol. 38, No. 4, (1995,) pp. 1129-1138.

J.T. Chien, J.E. Hoff, L.F. Chen, "Simultaneous Dehydration of 95% Ethanol and Extraction of Crude Oil from Dried Ground Corn", *Cereal Chem.*, vol. 65, No. 6, (1988,) pp. 484-486.

J.T. Chien, J.E. Hoff, M.J. Lee, H.M. Lin, Y.J. Chen, L.F. Chen, "Oil Extraction of Dried Ground Corn with Ethanol", *Chemical Engineering Journal*, vol. 43, (1990,) pp. B103-B113.

L.C. Dickey, M.F. Dallmer, E.R. Radewonuk, N. Parris, M. Kurantz, J.C. Craig, Jr., "Hydrocyclone Separation of Dry-Milled Corn", *Cereal Chem*, vol. 74, No. 5, (1997,) pp. 676-680.

M.P. Hojilla-Evangelista, L.A. Johnson, D.J. Myers, "Sequential Extraction Processing of Flaked Whole Corn: Alternative Corn Fractionation Technology with Ethanol Production", *Cereal Chem*, vol. 69, No. 6 (1992), pp. 643-647.

N. Singh, M. Cheryan, "Membrane Technology in Corn Wet Milling", *Cereal Foods World*, vol. 42, No. 7, (1997), pp. 520-525.

"Membrane Technology in Corn Refining and Bioproduct-Processing", Starch/Stärke, vol. 50, No. 1,(1998), pp. 16-23.

V. Singh, S.R. Eckhoff, "Effect of Soak Time, Soak Temperature and Lactic Acid on Germ Recovery Parameters", *Cereal Chem.*, vol. 73, No. 6, pp. 716-720.

Abstract of Funded Research, Fiscal Year 1997, (Cheryan, M. abstract No. 9701992) (1997), [on-line], [retrieved on Sep. 22, 2000]. Retrieved from the internet: <URL:http://www.reeusda.gov/nri/pubs/archive/abstracts/abstract97/contents.htm and http://www.reeu.

Cao, N., Zu, Q., Ni, J., Chen, L.F., "Enzymatic Hydrolysis of Corn Starch After Extraction of Corn Oil with Ethanol," Applied Biochemistry and Biotechnology, vol. 57-58, (1996), pp. 39-47.

FIG. 5

CORN OIL AND DEXTROSE EXTRACTION APPARATUS AND METHOD

PRIORITY CLAIM

This application claims the benefit of U.S. Provisional Application Ser. No. 60/598,998, filed Aug. 5, 2004, under 35 U.S.C. § 119.

BACKGROUND OF THE INVENTION

The present invention relates generally to corn milling processes and equipment. The invention specifically concerns production of one or more corn products, such as dextrose and corn oil, from corn.

Dextrose (glucose) is used in a variety of food and industrial products, and it serves as the starting material for high-fructose corn syrup and the substrate for almost all fermentations. The most common method of producing dextrose (often along with oil) from corn is wet milling. In wet milling corn is first soaked in water (steeped) for several hours prior to undergoing a series of grinding and separation steps that result in one or more of several products such as corn oil, starch, corn gluten feed, corn gluten meal, fiber, and corn steep liquor. In wet milling, the starch is purified to at least 99% purity, and it is subjected to heat treatment and reaction with two or more enzymes to convert it to dextrose. The dextrose solution is clarified and subjected to further purification steps to remove impurities such as color and minerals, and then evaporated, crystallized, and dried to produce dextrose powder.

SUMMARY OF THE INVENTION

A method and apparatus for processing corn into one or more corn products including dextrose is provided. In a preferred process, corn is treated with solvent(s) to extract oil. The oil can be subsequently recovered using membrane technology. Zein may also be produced if the solvent is an alcohol. Starch in the de-oiled meal is converted to dextrose by liquefaction and saccharification with enzymes. The reaction mixture containing the dextrose and other components is subjected to one or more unit operations such as screening, filtration, and/or membrane technology to produce one or more of corn gluten, soluble protein, dextrose, and fiber.

DETAILED DESCRIPTION

The following terms are used herein:

Corn gluten feed is a product of corn wet milling. Typically, corn gluten feed contains a minimum of 21% protein (dry basis). The remaining 79% includes fiber, steep liquor solids, germ proteins (if germ is processed at the plant), and other by-products of corn wet milling.

Corn gluten meal is a product of corn wet milling. Typically, corn gluten meal contains a minimum of 60% protein (dry basis). The remaining 40% is mainly starch.

Dextrose is another term for glucose. It is produced by the complete hydrolysis of starch. One pound of pure starch yields 1.11 pounds of glucose.

DE (dextrose equivalent) is approximately the weight of reducing equivalents per unit weight of product. Most commercial dextrose products are about 95% glucose, 2% disaccharides, and 3% trisaccharides. This is a DE of ~96.

DP (degree of polymerization) indicates the number of glucose molecules. DP-1 is glucose, DP-2 is maltose, DP-3 is maltotriose, etc.

Gluten refers to the two major insoluble fractions of corn, commonly termed "glutelin" and "zein". Gluten proteins are largely insoluble in water at normal or acidic pH. It may account for up to 80% of the total nitrogen in corn.

Soluble protein refers to the nitrogenous compounds that are normally soluble in an aqueous environment. These are primarily albumins, globulins, and other soluble nitrogen compounds, and may account for up to 20% of the nitrogen in corn.

Corn wet milling has a number of limitations. For example, wet milling requires high capital investments in plant and machinery. It also requires large amounts of water, typically 5-9 gallons per bushel of corn, primarily for the purification of starch and for steeping. Wet milling requires an additional steeping of corn. For steeping, corn is soaked in water at about 50° C. and for 22-50 hours. Sulfur dioxide is added, and lactic acid is produced by bacteria. Steeping is done mainly to facilitate and subsequent separation of the germ that contains the oil.

Additionally, the water from the above steeping step ("steep water") is dilute and has to be evaporated. This requires a significant amount of energy. The evaporated steep water ("corn steep liquor") is sold as such or added to the corn gluten feed, which is a low-value animal feed.

Further, the corn oil is in the germ of the corn kernel, and germ separation is a complicated process. Water with a specific density is added to the ground corn for transportation to flotation tanks or hydrocyclones, where the oil-bearing germ is separated. The germ then is sent to a series of screens, and the germ is washed with even more water. Next, the germ has to be processed, typically by dewatering, usually in germ presses. The pressed germ is typically 50% moisture and 25% oil, with the remainder being germ proteins (albumins and globulins) and other minor components of corn. Prior to extracting the oil the germ has to be dried.

If oil extraction is done on site, germ proteins are added to corn gluten feed, which is the lowest value product in a corn wet mill. If the germ is then sold to another processor, the germ proteins are lost. Typical corn wet milling operations recover, at best, less than 85% of the oil in corn. Typical yields of starch are 90% of the starch in the corn kernel. The rest of the starch becomes either part of the corn gluten meal and/or is lost with the fiber, and it ends up in the corn gluten feed.

In a wet mill, dextrose is produced by enzyme hydrolysis of corn starch. Corn wet millers first separate the fiber and the protein from the starch using a series of unit operations and complex equipment. Starch is then purified using large amounts of fresh water prior to enzyme hydrolysis.

Preferred embodiments and methods of the present invention eliminate the need for steeping, and yet produce corn oil in equivalent or better yields. Additional or alternative preferred approaches and methods eliminate starch separation and purification, and yet they produce dextrose in equivalent or higher yields. Preferably, low value streams such as corn steep liquor and corn gluten feed can be reduced or eliminated to produce higher value streams of corn protein and fiber.

Previous methods for producing dextrose from starch have nearly all included starting with pure starch, rather than an "impure" raw material or whole grain. However, extraction and purification of starch by conventional wet milling adds considerable expense to the production of dextrose, and it results in a 5%-10% decrease in yield of starch. Some methods, such as those disclosed in U.S. Pat. No. 4,069,103 to Muller, suggest that it is possible to obtain dextrose from protein-containing starches, and that it is not necessary to start with pure starch. Muller teaches subjecting the initial starch product to an acid or enzymatic hydrolysis or a combination of both types of hydrolysis, then circulating the hydrolysate, which contains a low-viscosity sugar solution and water-soluble high-molecular weight proteins, through an ultrafilter to separate the proteins from the sugar solution and recover the dextrose. Crude corn oil is obtained by centrifuging an aqueous suspension of the starch hyrdrolyzate.

Similarly, U.S. Pat. No. 4,501,814 to Schoenrock teaches using "impure" starch flour containing beta-glucans as the starting material. Beta-glucanese enzyme is added, followed by alpha-amylase. The solids and the cereal germ oils, according to Schoenrock, are separated from the aqueous solution and processed into useful by-products. The aqueous solution is saccharified into a high dextrose solution by the addition of glucoamylase. Then, the saccharified mixture is filtered and purified, and is pH-adjusted before isomerization into a high-fructose sweetener by conventional means. The preferred process of Schoenrock, however, still involves steeping to soften the barley grain to more readily extract the starch, followed by milling and separating the hulls.

U.S. Pat. No. 6,433,146, to the present inventor, describes methods and systems to produce corn oil and/or other products from various forms of corn without steeping, preferably with equivalent or greater yields, and preferably without the production or handling of germ. Generally, in an exemplary embodiment according to the '146 patent, corn oil is obtained from corn or corn products using an organic solvent such as ethanol to extract the oil, followed by a separation step to remove the extract and a membrane separation to concentrate the oil. In preferred embodiments, the solvent may be recycled. Additionally or alternatively, zein protein may be partially or substantially extracted according to the '146 patent using an extraction, separation, and membrane separation.

Figure 1:
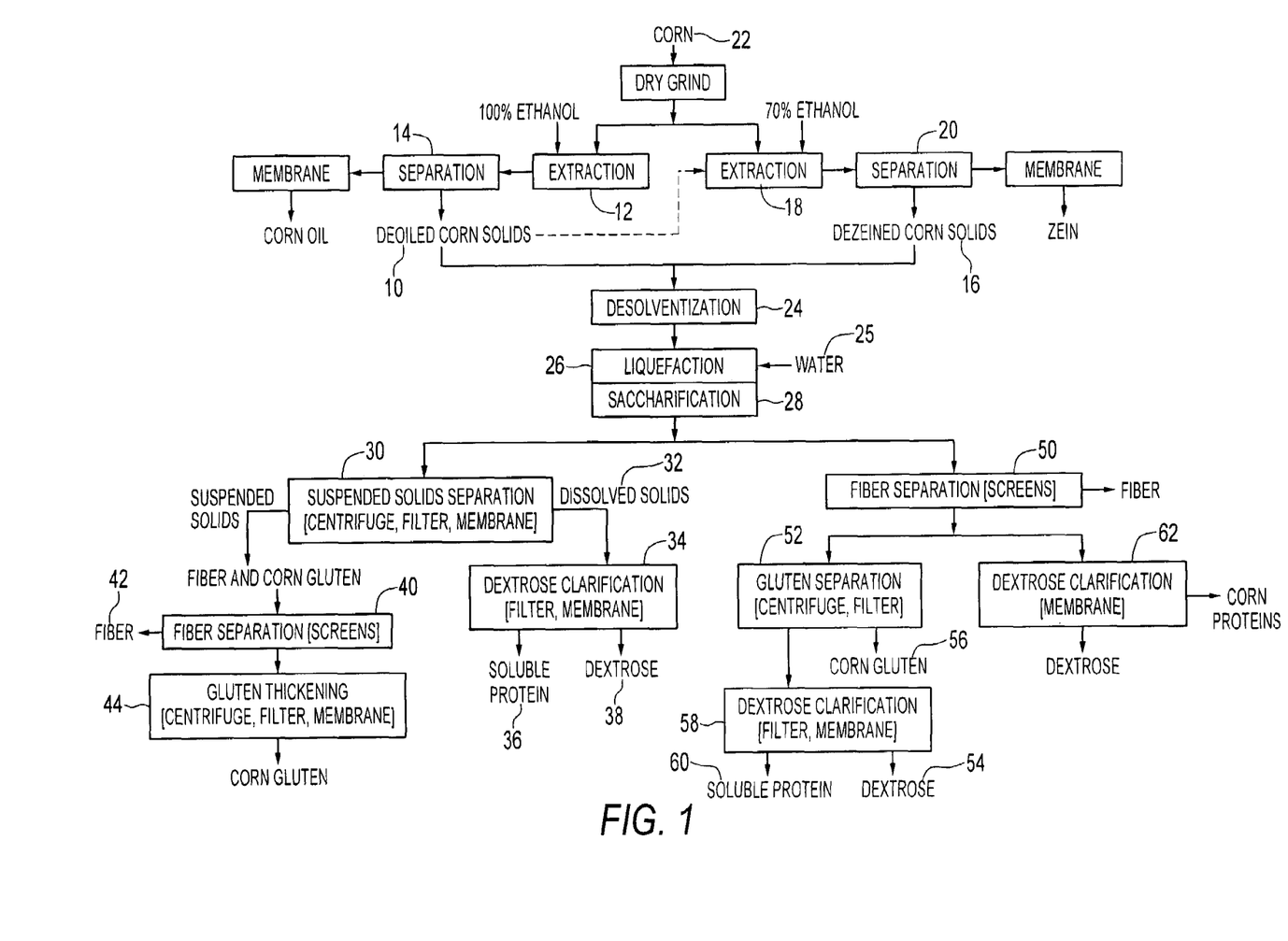
FIG. 1 is a schematic diagram showing general steps in a corn processing method according to a preferred embodiment of the present invention.

According to preferred embodiments of the present invention, an example of which is shown generally in FIG. 1, deoiled corn solids 10, such as those resulting from an extraction step 12 and a separation step 14, dezeined corn solids 16, such as those resulting from an extraction step 18 and a separation step 18, or deoiled zein-free corn solids, are used to obtain dextrose and possibly other products from corn 22. Preferably, starch that is converted into dextrose is neither separated nor purified. Instead, for example, the de-oiled corn solids 10 or dezeined corn solids 16, which optionally may be desolventized 24, are mixed with process water 25 to create a suspension. The starch is liquefied 26 and saccharified 28 by heating to gelatinize the starch and adding enzymes such as alpha-amylase and glucoamylase. After saccharification 28, an exemplary reaction mixture contains dextrose, fiber, protein (corn gluten and soluble protein), and water as major constituents, while the minor constituents are mineral salts, oily substances, and partially hydrolyzed starch, if any.

Generally, depending on the co-products required, the reaction mixture may be subjected to two types of downstream processes, as further illustrated in FIG. 1:

(1) In some exemplary embodiments, the suspended solids, primarily fiber and corn gluten, are separated 30 from the dissolved solids (primarily dextrose and soluble protein). This first separation step may be done by centrifugation, filtration, or membrane microfiltration, or any combination thereof. The dissolved solids stream 32 is subjected to a clarification step 34 to remove the soluble protein 36, fine colloidal particles, and/or emulsified solids (commonly termed "mud" in the art), resulting in a clarified dextrose solution 38. Clarification 34 can be done by, for example, filtration or membrane filtration. Examples of filtration and membrane filtration are described in, for example, Singh and Cheryan, "Microfiltration for clarification of corn starch hydrolysates", Cereal Foods World 42:21-24, 1997; Singh and Cheryan, "Membrane applications in corn wet milling", Cereal Foods World 42:520-525, 1997; Singh and Cheryan, "Membrane technology in corn refining and bio-products processing", Starch/Starke 50:16-23, 1998; Singh and Cheryan, "Performance characteristics of a ceramic membrane system for microfiltration of corn starch hydrolysate", Chemical Engineering Communications 168:81-95, 1998; and Singh and Cheryan, "Process design and economic analysis of a ceramic membrane system for microfiltration of corn starch hydrolysate", J. Food Engineering 37:57-67, 1998.

The clarified dextrose stream may then be decolorized and demineralized by the use of methods well-known in the art, such as ion-exchange and adsorption, followed by evaporation, crystallization, and drying to obtain dextrose powder. The partially evaporated liquor can also be processed into high fructose corn syrup, or the dextrose can be used as a medium for fermentation or to make other products.

The "mud" from the dextrose clarification step contains primarily soluble protein, but may also contain minor amounts of oily substances, minerals, and unseparated dextrose and partially converted starch (if any). Because the protein content of this stream preferably is 40-45% on a dry basis, this stream may be sold as a high-protein feed after dewatering and drying. If further purification and separation is needed, the suspended solids stream is separated 40 into fiber 42 and gluten in a fiber separator. The fiber 42 is washed with water to purify and dewater it. The gluten stream is thickened 44 and dewatered prior to drying. This gluten stream could also be subjected to membrane filtration to purify it for specific applications.

(2) In alternative embodiments, an initial step includes fiber separation 50, for example using screens or strainers. The separated fiber is washed with water to purify it as much as possible and recover as much of the dextrose and proteins as possible in the undersize stream of the screens. The undersize stream is subsequently processed by one of two methods, preferably.

In one preferred method, a gluten separation 52 is used to obtain a dextrose stream 54 and a corn gluten stream 56. The filter cake or the centrifuge underflow from the gluten separation may be reworked to enhance recovery of dextrose and purify the gluten. The liquid dextrose stream is clarified 58 using a filter or membrane to remove soluble protein 60, as described above.

Alternatively, the undersize stream can be subjected to membrane ultrafiltration or microfiltration 62. The gluten and soluble protein will be separated together as the retentate, and further clarification of the dextrose may not be necessary.

Figure 2:
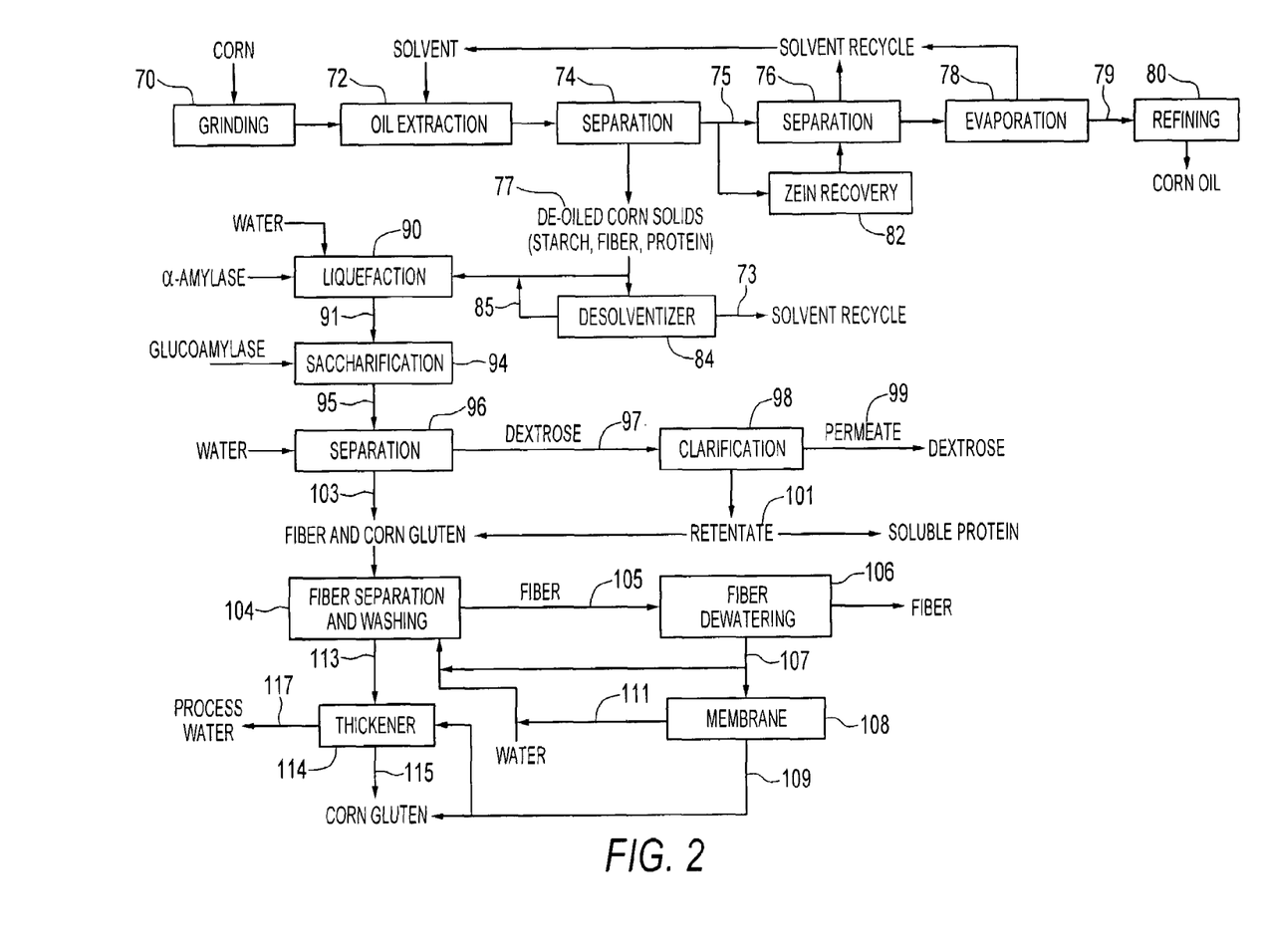
FIG. 2 illustrates an exemplary method for producing one or more of corn oil, dextrose, fiber, gluten protein, and soluble protein according to an embodiment of the present invention.

Referring now to FIG. 2, a more specific description of a preferred embodiment follows. Oil and/or zein from corn can be extracted from corn (e.g., whole kernel or flaked corn) or corn processing by-products (e.g., DDG, DDGS (distilled dried grains with solubles), corn gluten meal, corn germ, or corn meal), and the corn or corn processing by-products provide a raw material. The raw material is ground and/or sieved 70 to an appropriate size and shape. For example, a hammer mill or similar size reduction device, or a flaking machine, is used to reduce the corn to an optimum particle size for extraction of oil with a particular solvent. If the raw material is a corn processing by-product, such as whole corn meal from a dry miller, this grinding or sieving step 70 may not be necessary. Preferably, moisture content of the corn should be 0-15% by weight.

The oil is extracted 72 using an appropriate solvent in an extractor. For example, ethanol, hexane, acetone and the like may be used, provided the solvent efficiently extracts oil from the corn particles or flakes.

The resulting slurry including the corn solids and the solvent is subjected to a separation step 74, which may be, for example, centrifugation or filtration. The slurry is separated into an extract 75 and a de-oiled residue 77. The extract 75 is processed 76 through, for example, nanofiltration or reverse osmosis membranes to separate oil and/or other extracted components from the solvent. The concentrated extract is sent to an evaporator 78 to remove the residual solvent. This removed solvent may be re-used in the extraction step 72. The crude corn oil 79 preferably is subjected to a refining step 80, for example using methods known in the vegetable oil industry.

Additionally, if ethanol, isopropanol, or any other solvent for extracting zein is used, a (usually) small amount of zein may be coextracted with oil in the extraction step 72. The zein can be recovered 82 prior to the separation step 76 by processing the extract 75 with an ultrafiltration membrane, for example, and the recovered solvent from this step can be recycled as well. Exemplary methods and membranes are described in the '146 patent cited above.

The de-oiled corn solids 77 typically contain starch, protein, fiber, minor constituents of corn, and adsorbed solvent. These de-oiled corn solids 77 can be sent directly to a liquefaction step 90 or, optionally, the de-oiled corn solids can undergo a desolventizing step 84 prior to gelatinization. This desolventization step 84 can be done by various methods, such as vacuum, steam, or gas. Heat may be applied to facilitate desolventizing the corn solids. The resultant solvent 73 may be reused in the extraction step 72.

Though it is not necessary for ethanol or other solvent to be produced in the same facility as the extraction method described herein, in-house ethanol may be preferred for economic reasons. For example, fermentation and distillation steps may be conducted to produce an ethanol supply for the extraction step 72. However, ethanol or other solvent for the extraction step 72 may be procured from outside sources. Costs may be reduced by practicing extensive recycling of the solvent via the membrane step 76, the evaporation step 78, and/or the desolventizing step 84. The number of times the solvent can be recycled will depend on the level of impurities contained in the used solvent, and how it affects the extraction efficiency in the extraction step 72.

According to preferred embodiments of the present invention, de-oiled, desolventized corn solids 85, or de-oiled corn solids, are used to produce dextrose. In an exemplary method, water, either fresh or "process water" recycled from downstream operations, is added to the corn solids to form a suspension. The amount of water added should be sufficient to efficiently conduct liquefaction and saccharification. Typically, the starch level in the slurry is about 30-35% by weight. A starch liquefaction step 90 is performed in a suitable manner. Methods of performing the liquefaction step 90 are known in the art. Preferably, the corn solids slurry is heated to 95-150° C., and alpha-amylase enzyme is added for a period of a few minutes to 3 hours. This results in debranching or "thinning" of the starch, and serves to facilitate the saccharification step. In continuous operations, gelatinization preferably is performed in a "jet-cooker". In smaller operations, it can be performed in a jacketed, steam-heated tank at lower temperatures for longer times. Suitable operating conditions, such as temperature, time, pH, calcium levels, enzyme concentration, and the like, as well as the optimum DE to obtain at this stage will be understood by those skilled in the art.

The liquefied starch 91 is adjusted to the optimum temperature and pH for a saccharification reaction step 94, which preferably is done in saccharification tanks or a reactor. In an example of the saccharification step 94, starch is broken down to dextrose by glucoamylase enzyme(s), which process may take between 20-60 hours depending on the DE required in the dextrose stream and the reaction conditions. Suitable combinations of operating conditions, such as temperature, time, pH, enzyme concentration, and the like, will be understood by those skilled in the art.

At the end of the saccharification step 94, a reaction mixture 95 results. Preferred major components in the reaction mixture 95 include dextrose, gluten, soluble protein, fiber, and water. Exemplary minor components include mineral salts, oily compounds, and unreacted or partially reacted starch resulting from incomplete starch hydrolysis, if any.

The reaction mixture 95 is subjected to a separation step 96 to separate the dextrose from the other components. This separation step 96 may be centrifugation, filtration, or membrane microfiltration, or any combination of these operations, resulting in a liquid stream 97 and a solids stream 103. Water, either fresh water or process water, may need to be added to the centrifuge underflow or filter cake in the separation step 96 to enhance recovery of the dextrose.

If done by centrifugation or filtration, the liquid stream 97 (which may be the overflow from a centrifuge or filtrate from a filter) will include largely dextrose and water, but may still contain amounts of soluble protein, oily compounds, and the like that are undesirable in dextrose. These undesirable components (commonly termed "mud" in the industry) are preferably removed by a clarification step 98, which may be, for example, filtration or membrane filtration. Exemplary techniques for filtration and membrane filtration of dextrose streams are known to those of ordinary skill in the art. The clarification step 98 results in a second liquid stream 99 (the "permeate" if done by membranes) and a second solids stream 101 containing the mud (the "retentate" if done by membranes). The clarified dextrose stream (second liquid stream 99) may then be demineralized, decolored, evaporated, crystallized, and dried for sale as dextrose powder, can be processed further into high fructose corn syrup, or can be used as a medium for fermentation or used to make other products.

The second solids stream 101 ("mud") contains primarily the soluble protein and perhaps minor components such as oily compounds, salts and unreacted or partially reacted starch and unseparated dextrose. This may be mixed with the solids stream 103 and subjected to washing and purification, processed in a thickener, mixed with the corn protein stream 115, or marketed as a separate product, depending on the market and the processing conditions.

If the separation step 96 is membrane filtration, specifically microfiltration or ultrafiltration, the first liquid stream 97 typically will be essentially clarified dextrose, and there may not be a need for the membrane clarification step 98. Diafiltration may be necessary to maximize recovery of the dextrose.

The first solids stream 103 contains mainly the non-dextrose components of the process mixture such as gluten, fiber, and water, and the minor constituents such as mineral salts, oily compounds, and unreacted or partially converted starch (if any). Stream 103 preferably will be about 40-45% protein on a dry basis, assuming no losses in the upstream operations. It can be subjected to dewatering and drying for sale as a high-protein fiber for human consumption or high-protein animal feed.

Alternatively, the first solids stream 103 may be subjected to additional separation steps to separate the fiber from the gluten, such as a fiber separation and washing step 104, which may contain a multitude of separate steps within it. Examples of the separation and washing step 104 are known to those skilled in the art. For example, it may be necessary to further grind the corn solids in the first solids stream 103 to release some of the gluten from the fiber. Any of several milling devices known to practitioners in the corn wet milling industry may be used. For example, Entoleter-type mills that sling the material against pins at high speed may be used to free the gluten with minimum fiber breakup. Disk mills, with counter-rotating disks or with only one disk rotating at high speed, can also be used.

Another exemplary method of fiber separation in corn milling is a 50-70 micron wedge-wire pressure-fed screen, such as the 120 DSM screens made by Dorr-Oliver. Wash water, which may be fresh or recycled process water from other steps, is introduced in the last stages of the unit and flows counter-current to the fiber. The wash water emerges from the first fiber washing stage as the "undersize" fraction 113 with all the protein that was in stream 95. The washed fiber 105 from the last stage of the separation and washing step 104 is dilute, typically 5-20% solids. It is dewatered 106 by mechanical means using screen centrifuges, screened reels, screw presses, belt presses or the like. The fiber may then be dried in and/or mixed with other streams before drying.

Water 107 from the fiber dewatering step 106 may contain some protein. It may be sent back to the fiber separation step 104, or processed through an ultrafilter fitted with a protein-retaining membrane 108 to recover the protein that may be present in the fiber wash water. The retained solids stream 109 can be mixed with the mud stream or sent to the protein thickener 114, or it may be marketed as a protein product by itself. A permeate 111 can be used for the fiber separation 104 or as process water elsewhere in the plant.

After the fiber separation, the stream 113 should contain only gluten (less the zein that may have been removed in ultrafiltration step 82) and some soluble impurities. The solids level of the stream 113 may be low. It can be increased in a thickening step 114, which may employ a centrifuge, a filter, or a membrane filtration system. The solids level of the result 115, such as the underflow (if thickened with a centrifuge), filter cake (if a filter press is used) or the retentate (if thickened with a membrane) may be 10%-30% by weight and can be one of the coproducts ("corn gluten"). The overflow or permeate 117, as the case may be, can be used as process water in the plant, which will also serve to recycle any solids that may be entrained.

Figure 3:
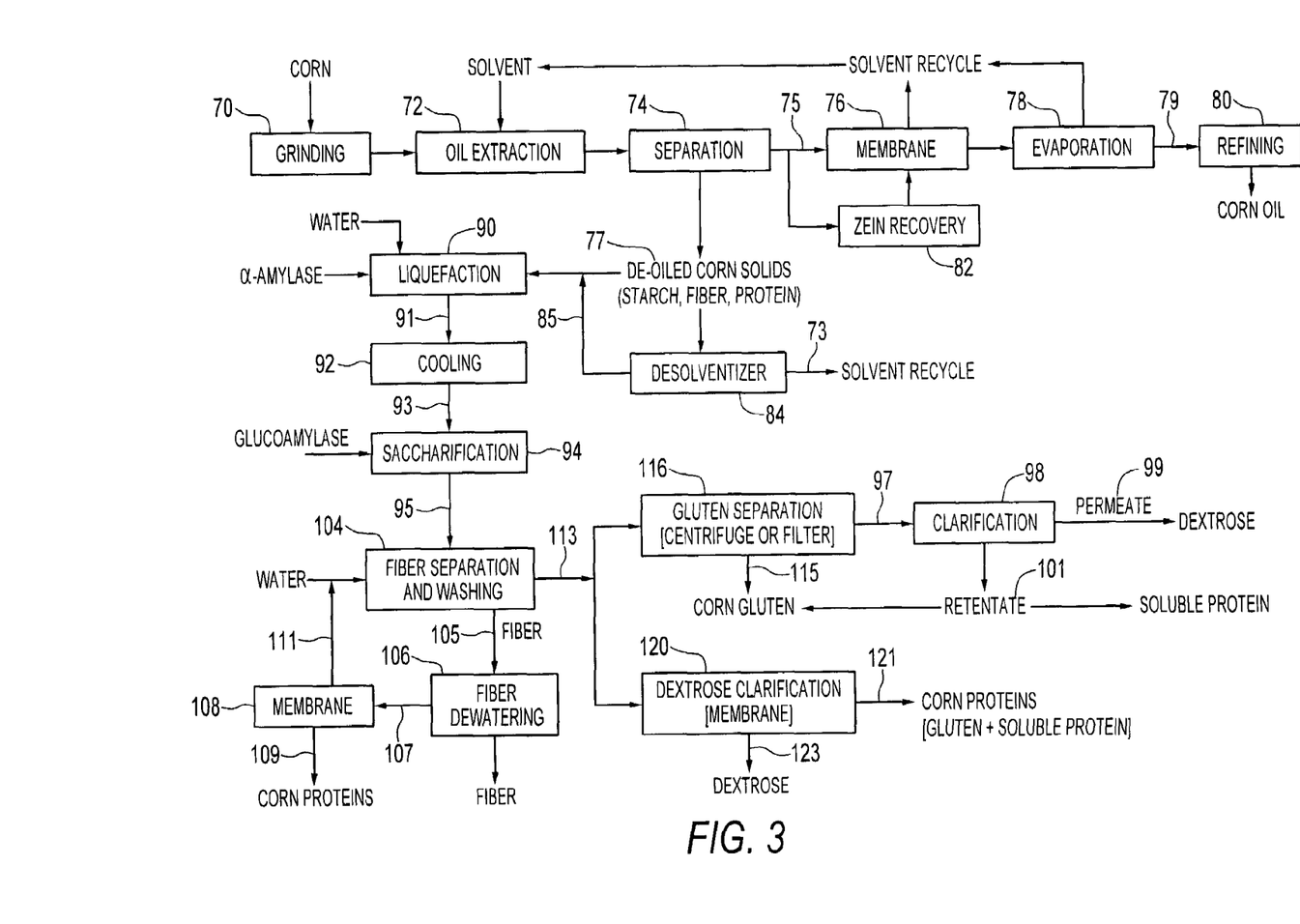
FIG. 3 illustrates an alternative method for producing one or more of corn oil, dextrose, fiber, gluten protein, and soluble protein according to another embodiment of the present invention.

Referring now to FIG. 3, showing an alternative process, the process shown is the same as FIG. 2 until the saccharification step 94. In FIG. 3, the reaction mixture 95 is subjected first to a fiber separation and washing step 104, which usually employs a screen or strainer, as described above. Washed fiber 105 is dewatered 106, with the wash water 107 being used as process water. The wash water 107 may be membrane microfiltered or ultrafiltered 108 to recover the protein 109 (either gluten or soluble protein or both), and the permeate 111 may be used as process water.

Stream 113, containing the proteins and dextrose, is subjected to either a separation step 116 or an alternative separation step 120 (dextrose clarification). Separation step 116 may use a centrifuge or filter, which will remove the gluten and allow the dextrose stream 97, perhaps containing soluble proteins, to pass into the dextrose clarification device 98 as described earlier. The gluten stream 115 may be purified by washing the filter cake or repulping the centrifuge sludge with water, depending on whether a filter or centrifuge is used, and may be reprocessed in a device similar to the device in the separation step 116. Conducting the steps 116 and 98 will result in two separate protein streams 115 and 101.

Alternatively, if it is not necessary to recover two separate protein streams, the stream 113 can be subjected to clarification 120, such as membrane microfiltration or ultrafiltration with a membrane designed to retain all proteins and other mud components while allowing relatively free passage of the dextrose. A permeate 123 will be clarified dextrose, while a retentate 121 will be "corn proteins" containing both gluten and soluble protein.

Figure 4:
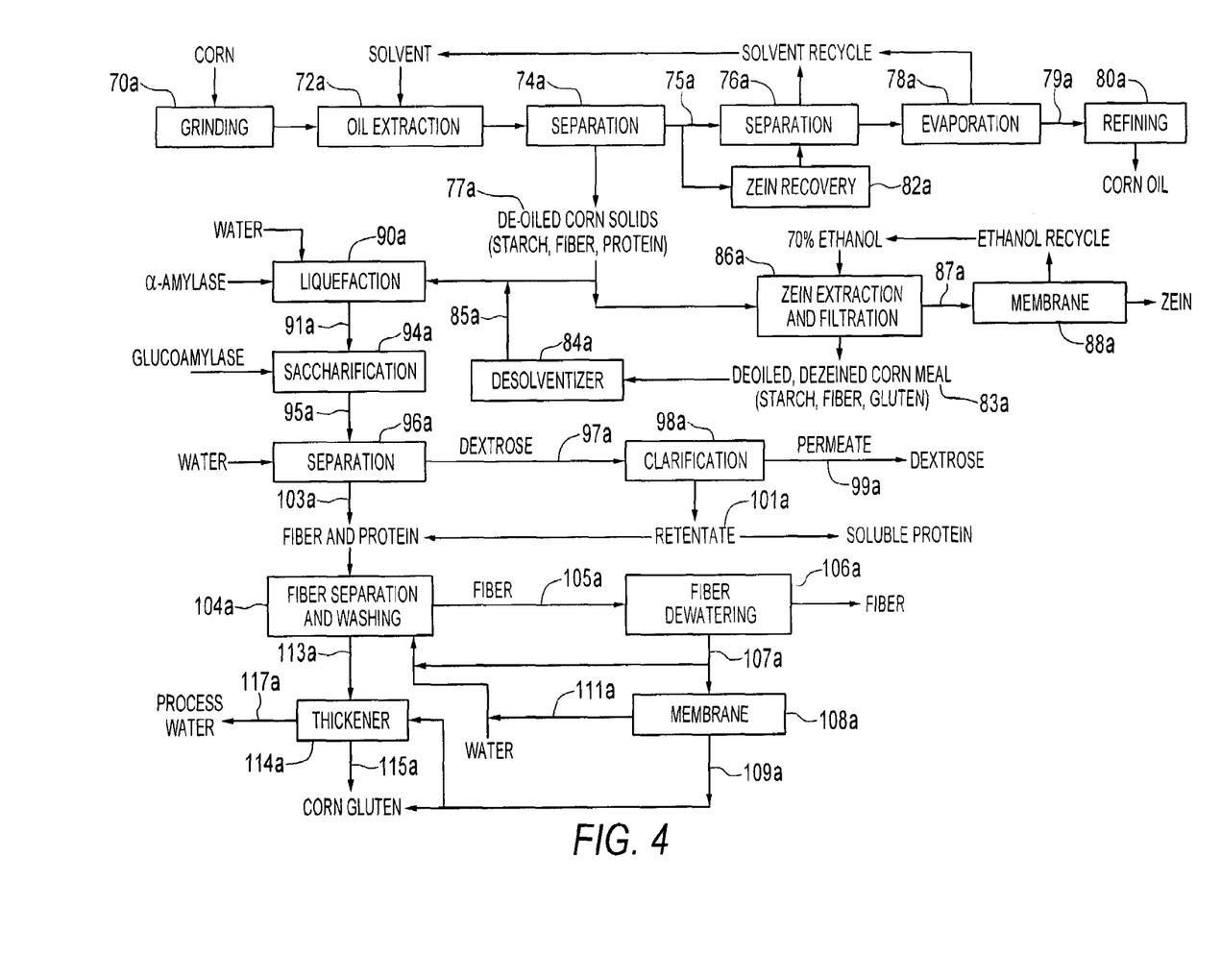
FIG. 4 illustrates an exemplary process of the present invention for producing one or more of zein, corn oil, dextrose, fiber, gluten protein, and soluble protein.

Referring now to FIG. 4, an exemplary process to maximize production of oil and zein is illustrated. Zein is an alcohol-soluble protein that has a multitude of uses. Steps similar to those shown and discussed with respect to FIG. 2 are labeled with like reference numerals. Corn or corn processing by-products are the main raw material for this embodiment. The process for oil extraction in this example is the same as described for FIG. 2, and is shown in FIG. 4 as steps 70a through 80a. In this embodiment, the deoiled corn solids 77a are re-extracted 86a with 60-90% aqueous ethanol, more preferably 65-75% aqueous ethanol in a suitable extractor. If a solvent other than 95-100% aqueous ethanol is used for the oil extraction, the deoiled corn solids 77a must be desolventized before zein extraction (not shown in FIG. 4). After zein extraction 86a, the ethanol slurry is separated by filtration or centrifugation into an extract 87a and a deoiled, de-zeined corn solids residue 83a. The extract 87a is processed through ultrafiltration membranes 88a to separate the zein from the solvent and other low molecular weight impurities. Exemplary methods for such membrane ultrafiltration are provided in the '146 patent.

The de-oiled, de-zeined corn solids 83a typically contain starch, protein other than zein, fiber, minor constituents of corn, and adsorbed solvent and water. The corn solids 83a are desolventized 84a by any suitable means, such as vacuum, steam, air or gas. Heat may be applied to facilitate desolventizing the corn solids. The solvent vapor may be reused in the extraction step 72a.

Similar to the process shown in FIG. 2, the deoiled-dezeined-desolventized solids 85a containing mainly starch, fiber and nonzein protein are subjected to liquefaction, saccharification, and separation operations to produce dextrose, fiber, corn gluten, and soluble protein, as illustrated in and described for FIG. 2.

Figure 5:
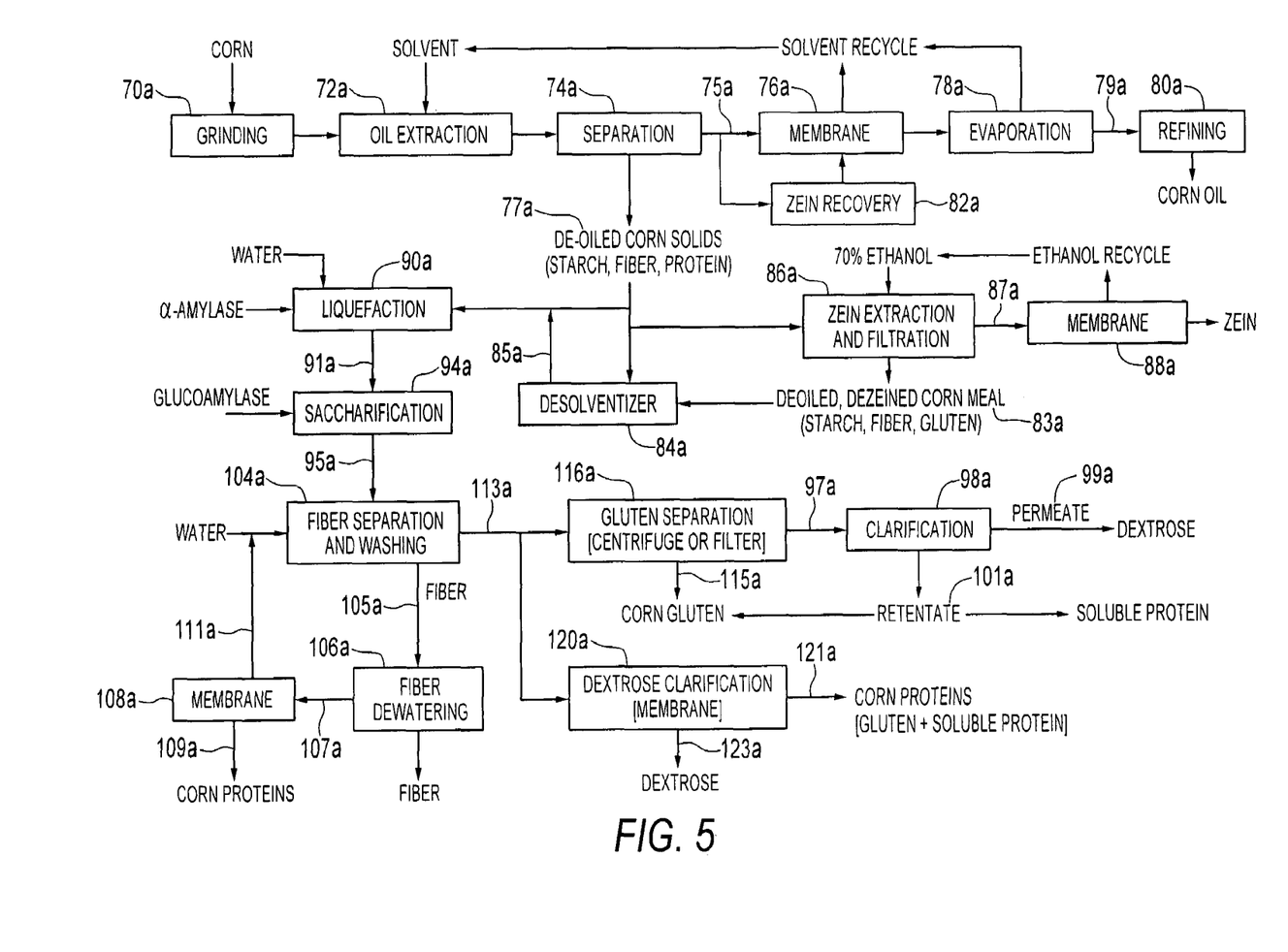
FIG. 5 illustrates an alternative process for producing one or more of zein, corn oil, dextrose, fiber, gluten protein, and soluble protein, according to an embodiment of the present invention.

An exemplary process of the invention to maximize oil and zein is illustrated in FIG. 5 using the processes that are otherwise the same as FIGS. 3 and 4.

In summary, preferred embodiments of the invention provide efficient, flexible and simple processes for production of oil and dextrose from corn. Such embodiments preferably have one or more of the following advantages:

1. Steeping of corn is eliminated. Steeping is one of the most troublesome and unpredictable steps in corn wet milling.
2. Steep water evaporators are eliminated. This is one of the biggest users of energy in a corn wet mill.
3. There is no loss of corn solids due to leaching into the steep water. Leaching losses are particularly severe if the corn is broken or damaged. An exemplary process also can handle broken and damaged kernels; this is advantageous since broken or damaged kernels may be available at lower cost.
4. Germ handling and separation preferably are completely eliminated.
5. Crude corn oil is produced rather than germ, thus providing a better return to the corn processor if the germ is sold to a vegetable oil processor.
6. Germ proteins are retained by the corn processor rather than being lost with the germ (if the germ is sold to an outside oil processor) or being put into low-value corn gluten feed. Instead, in preferred embodiments, germ proteins are part of the "soluble protein" fraction, which may be a higher-value coproduct.
7. Oil yields are higher. An exemplary process can obtain oil yields of 93% or greater, depending on the solvent used and the type of extractor, whereas oil yield in a typical corn wet mill is 85%.
8. Low-value corn gluten feed preferably is eliminated. In a traditional corn wet mill, corn gluten feed is typically 21% protein (dry basis). This low-value product is used as a repository for otherwise unmarketable components or by-products or waste matter generated in a corn wet mill. Examples include corn steep liquor, fiber, germ proteins, "mud" from the clarification of dextrose, fermentation by-products, filter aid and the like. If necessary, a 21% protein feed could be produced in the practice of embodiments of this invention by blending the corn gluten, the "mud", and fiber to the appropriate levels.
9. Similarly, the DDGS by-product in a dry-grind ethanol plant is a repository for otherwise unmarketable components or by-products or waste matter generated in a dry-grind ethanol plant. Examples include fermentation by-products such as organic acids, glycerol, and yeast cells in addition to the fiber and proteins. A DDGS-like product may still be generated if needed, if the retentate from the membrane clarification step 101 is used for fermentation and the suspended solids from the fermentation are added to the DDGS.
10. Starch washing and purification preferably are eliminated and, along with it, the large volumes of fresh water needed for starch purification.
11. Dextrose yields are higher with preferred embodiments of this invention than in many other methods. In a typical corn wet mill, pure starch yield is about 90% of the starch in the corn kernel. The rest of the starch goes either to the corn gluten meal and/or to the corn gluten feed, the latter due to inefficiencies in the fiber separation step. In contrast, the yield of dextrose in preferred embodiments of this invention will be 5-10% higher. The higher yield of dextrose is the reason why ethanol yield from a dry-grind ethanol plant is 5-10% higher than ethanol yield in a wet mill ethanol plant.
12. A substantially pure corn fiber is generated that may have higher market value than if it is incorporated into corn gluten feed.
13. A new protein fraction termed "soluble protein" may be produced.
14. Preferred embodiments of the invention use less fresh water than conventional corn wet milling.

In the above description, it should be understood that "membrane" refers to the appropriate membrane, whether it is microfiltration, ultrafiltration, nanofiltration or reverse osmosis. Further, it should be understood that diafiltration may be used when necessary to purify the solids or to enhance recovery of the product and that combinations of these membrane techniques may be used. It will be further understood that specific corn products can be selected for production, and thus it may not be necessary to produce all available products in a particular process, nor to perform all steps to make such corn products available.

The various embodiments described in the present invention should not be construed as being restrictive in that other modifications, substitutions and alternatives to specific equipment and methods are possible and will be understood by those of ordinary skill in the art. Such modifications, substitutions and alternatives can be made without departing from the spirit and scope of the invention, which may be determined from the appended claims.

Various aspects of the present invention are provided in the appended claims.

What is claimed is:

1. A corn product removal process for providing at least dextrose and oil from corn, the process comprising the steps of:
   extracting oil from the corn with a solvent to produce a corn-solvent mixture;
   separating the oil from the corn-solvent mixture to produce deoiled corn solids including starch;
   converting the starch to starch hydrolysates to produce a reaction mixture including dextrose; and
   separating dextrose from the reaction mixture;
   wherein said separating dextrose from the reaction mixture comprises:
      separating suspended solids in the reaction mixture including fiber and corn gluten from dissolved solids including dextrose to produce a first product comprising fiber and corn gluten and, a second product comprising a solution of dissolved solids including dextrose; and
      clarifying the solution of dissolved solids to produce a clarified dextrose solution.

2. The method of claim 1, further comprising:
   before said converting the starch, separating the solvent from the deoiled corn solids to produce deoiled and desolventized corn solids including starch.

3. The method of claim 2, wherein said separating the solvent comprises membrane processing the deoiled corn solids.

4. The method of claim 1, wherein the solvent comprises at least one of a hydrocarbon, an alcohol, and ethanol.

5. The method of claim 1, wherein said separating oil comprises at least one of centrifugation, filtration, and membrane filtration to separate an oil-solvent mixture from the corn-solvent mixture.

6. The method of claim 5, further comprising:
   separating oil from the oil-solvent mixture.

7. The method of claim 1, wherein said converting comprises:

combining the deoiled corn solids with water to provide a suspension;
liquefying the starch; and
saccharifying the liquefied starch.

8. The method of claim 7, wherein said liquefying comprises:
heating the suspension;
adding alpha-amylase enzyme to the heated suspension to produce a liquefied starch.

9. The method of claim 8, wherein said saccharifying comprises adding glucoamylase enzymes to the liquefied starch.

10. The method of claim 1, wherein said clarifying comprises separating at least one of soluble protein, fine colloidal particles, and emulsified solids from the dissolved solids.

11. The method of claim 1, further comprising:
separating fiber from the suspended solids;
thickening corn gluten from the suspended solids after said separating fiber.

12. The method of claim 10, wherein said clarifying comprises membrane separation:
wherein said separating suspended solids comprises:
using at least one of a screen and a strainer to separate fiber from the reaction mixture; and
using at least one of a centrifuge and a filter to separate corn gluten from the reaction mixture.

13. A corn product removal process for providing at least dextrose and oil from corn, the process comprising the steps of:
extracting oil from the corn with a solvent to produce a corn-solvent mixture;
separating the oil from the corn-solvent mixture to produce deoiled corn solids including starch;
converting the starch to starch hydrolysates to produce a reaction mixture including dextrose; and
separating dextrose from the reaction mixture;
wherein said separating dextrose from the reaction mixture comprises:
separating fiber from the reaction mixture for making a product comprising a solution comprising dextrose; and
clarifying the solution dextrose in the reaction mixture after said separating fiber.

14. The method of claim 13, further comprising:
separating corn gluten from the reaction mixture after said separating fiber;
wherein said clarifying the dextrose is after said separating corn gluten.

15. A corn product removal process for providing at least dextrose and zein from corn, the process comprising the steps of:
extracting zein from the corn with an ethanol or isopropanol solvent to produce a corn-solvent mixture;
separating the zein from the corn-solvent mixture using at least one of centrifugation, filtration, and membrane filtration to produce dezeined corn solids including starch;
converting the starch to starch hydrolysates to produce a reaction mixture including dextrose; and
separating dextrose from the reaction mixture;
wherein said separating dextrose from the reaction mixture comprises:
separating suspended solids in the reaction mixture including fiber and corn gluten from dissolved solids including dextrose to produce a first product comprising fiber and corn gluten and, a second product comprising a solution of dissolved solids including dextrose; and
clarifying the solution of dissolved solids to produce a clarified dextrose solution;
wherein said clarifying comprises separating at least one of soluble protein, fine colloidal particles and emulsified solids from the dissolved solids.

16. The method of claim 15, further comprising:
before said converting the starch, separating the solvent from the dezeined corn solids to produce dezeined and desolventized corn solids including starch.

17. The method of claim 16, wherein said separating the solvent comprises membrane processing the dezeined corn solids.

18. The method of claim 15, wherein said converting comprises:
combining the dezeined corn solids with water to provide a suspension;
liquefying the starch; and
saccharifying the liquefied starch.

19. The method of claim 18, wherein said liquefying comprises heating the suspension and adding alpha-amylase enzyme to the heated suspension to produce a liquefied starch; and
wherein said saccharifying comprises adding glucoamylase enzymes to the liquefied starch.

20. The method of claim 15, wherein said separating zein comprises:
separating a zein-solvent mixture from the corn-solvent mixture;
separating zein from the zein-solvent mixture.

21. The method of claim 20, wherein the corn-solvent mixture further comprises oil, and further comprising:
separating an oil-solvent mixture from the corn-solvent mixture;
separating oil from the oil-solvent mixture.

22. A corn product removal process for providing at least dextrose and zein from corn, the process comprising the steps of:
extracting zein from the corn with an ethanol or isopropanol solvent to produce a corn-solvent mixture;
separating the zein from the corn-solvent mixture using at least one of centrifugation, filtration, and membrane filtration to produce dezeined corn solids including starch;
converting the starch to starch hydrolysates to produce a reaction mixture including dextrose; and
separating dextrose from the reaction mixture;
wherein said separating dextrose from the reaction mixture comprises:
separating fiber from the reaction mixture for making a product comprising a solution comprising dextrose; and
clarifying the solution dextrose in the reaction mixture after said separating fiber.

23. The method of claim 22, wherein said separating dextrose from the reaction mixture further comprises:
separating corn gluten from the reaction mixture;
wherein said clarifying the dextrose in the reaction mixture is after said separating fiber and said separating corn gluten.

24. The method of claim 23, wherein said separating corn gluten from the reaction mixture is after said separating fiber.

25. A corn product removal system comprising:
an extractor extracting at least one of oil and zein from corn with a solvent to produce a corn-solvent mixture;
a separator for separating at least one of oil and zein from the corn-solvent mixture to produce deoiled and/or dezeined corn solids including starch;

a liquefaction and saccharification system for converting the starch to starch hydrolysates and producing a reaction mixture including dextrose; and a separator for separating dextrose from the reaction mixture;

wherein said separator comprises:

a suspended corn solids separator for separating suspended solids in the reaction mixture including fiber and corn gluten from dissolved solids including dextrose to produce a first product comprising fiber and corn gluten and, a second product comprising a solution of dissolved solids including dextrose; and a clarifier for clarifying the solution of dissolved solids to produce a clarified dextrose solution.

26. The system of claim 25, further comprising:

a solvent separator between said extractor and said liquefaction and saccharification system for separating the solvent from the deoiled and/or dezeined corn solids to produce deoiled and/or dezeined, desolventized corn solids including starch.

* * * * *

UNITED STATES PATENT AND TRADEMARK OFFICE
CERTIFICATE OF CORRECTION

PATENT NO. : 7,481,890 B2  Page 1 of 1
APPLICATION NO. : 11/197115
DATED : January 27, 2009
INVENTOR(S) : Cheryan It is certified that error appears in the above-identified patent and that said Letters Patent is hereby corrected as shown below:

| | |
|---|---|
| Col. 3, Line 60 | Please delete "separation step 18" and insert --separation step 20-- in its place. |
| Claim 13, Col. 11, Line 41 | Please delete "solution dextrose" and insert --solution comprising dextrose-- in its place. |
| Claim 22, Col. 12, Line 52 | Please delete "solution dextrose" and insert --solution comprising dextrose-- in its place. |

Signed and Sealed this

Second Day of June, 2009

JOHN DOLL
*Acting Director of the United States Patent and Trademark Office*